United States Patent [19]

Marenin

[11] Patent Number: 5,195,185
[45] Date of Patent: Mar. 16, 1993

[54] DYNAMIC BUS ARBITRATION WITH CONCURRENT SAME BUS GRANTING EVERY CYCLE

[75] Inventor: George B. Marenin, San Jose, Calif.

[73] Assignee: International Business Machines Corporation, Armonk, N.Y.

[21] Appl. No.: 841,227

[22] Filed: Feb. 21, 1992

Related U.S. Application Data

[63] Continuation of Ser. No. 586,349, Sep. 21, 1990, abandoned.

[51] Int. Cl.⁵ .................. G06F 13/18; G06F 13/28
[52] U.S. Cl. ............................ 395/325; 395/200; 395/275
[58] Field of Search ................ 395/200, 325, 275

[56] References Cited

U.S. PATENT DOCUMENTS

| 4,453,211 | 6/1984 | Askinazi et al. | 364/200 |
| 4,481,580 | 11/1984 | Martin et al. | 364/200 |
| 4,837,677 | 6/1989 | Burrus, Jr. et al. | 364/200 |
| 4,924,427 | 5/1990 | Savage et al. | 364/900 |
| 4,947,368 | 8/1990 | Donaldson et al. | 395/325 |
| 4,949,301 | 8/1990 | Joshi et al. | 364/900 |
| 4,967,344 | 10/1990 | Scavezze et al. | 364/200 |
| 4,987,529 | 1/1991 | Craft et al. | 364/200 |
| 5,001,625 | 3/1991 | Thomas et al. | 395/325 |
| 5,006,982 | 4/1991 | Ebersole et al. | 364/200 |
| 5,016,162 | 5/1991 | Epstein et al. | 364/200 |
| 5,043,937 | 8/1991 | Glaise et al. | 364/900 |

OTHER PUBLICATIONS

IBM Microchannel Architecture Supplement for the PS/2 Hardware Interface Technical Reference, Nov. 1989, pp. 30-33.
Intro. to VLSI Systems, Mead & Conway, Addison-Wesley, 1980.

Primary Examiner—Dale M. Shaw
Assistant Examiner—D. Dinh
Attorney, Agent, or Firm—Henry E. Otto, Jr.

[57] ABSTRACT

Apparatus and method for optimizing bus arbitration during direct memory access (DMA) data transfers across a nondedicated bus between a memory and/or a plurality of external devices each master having an arbitration priority. At least two nonoverlapping clocks are provided per transfer cycle and there is at least one transfer cycle per arbitration cycle. Arbitration priority requests are transmitted from each external device to an arbitration bus only at the rise of the first clock. At the end of the last clock, the priority code of the external device having the highest priority is determined to designate the external device which is to become bus master. Addresses and data are transferred between the designated bus master and the memory or another of the external devices via the nondedicated bus during the next cycle after a then active bus master relinquishes control. The priorities of the external devices can be changed dynamically. Arbitration cycles are pipelined in such manner that there is no loss of address or data transfer cycles. The then active bus master may extend the number of cycles during which it communicates with one or more external devices. A device designated as next in line as bus master may be preempted under a certain condition.

17 Claims, 3 Drawing Sheets

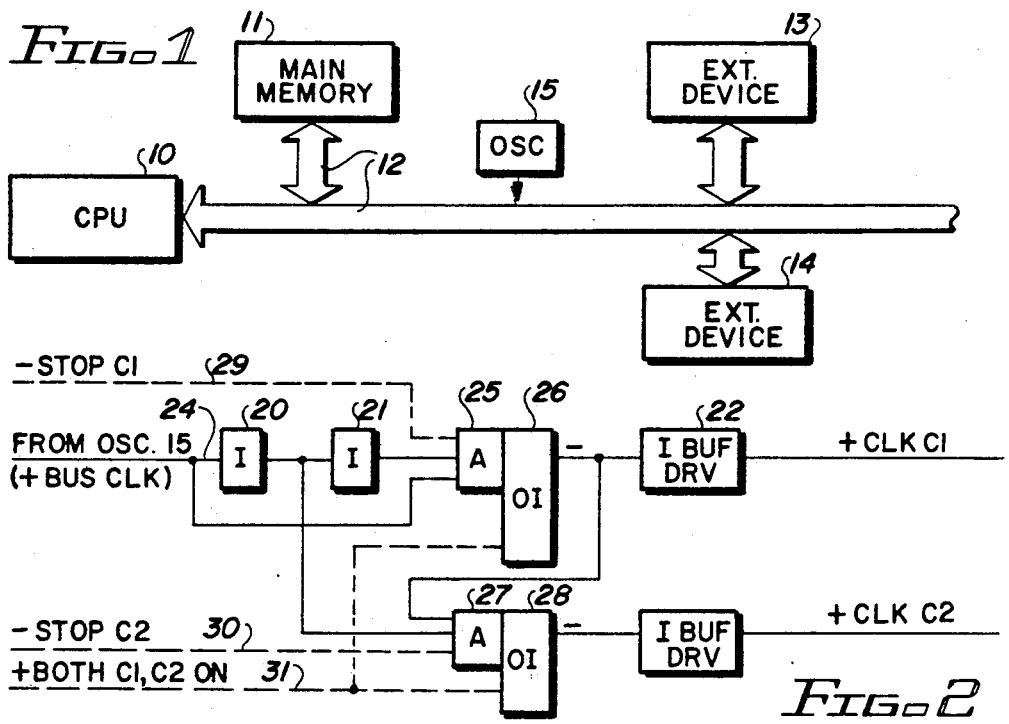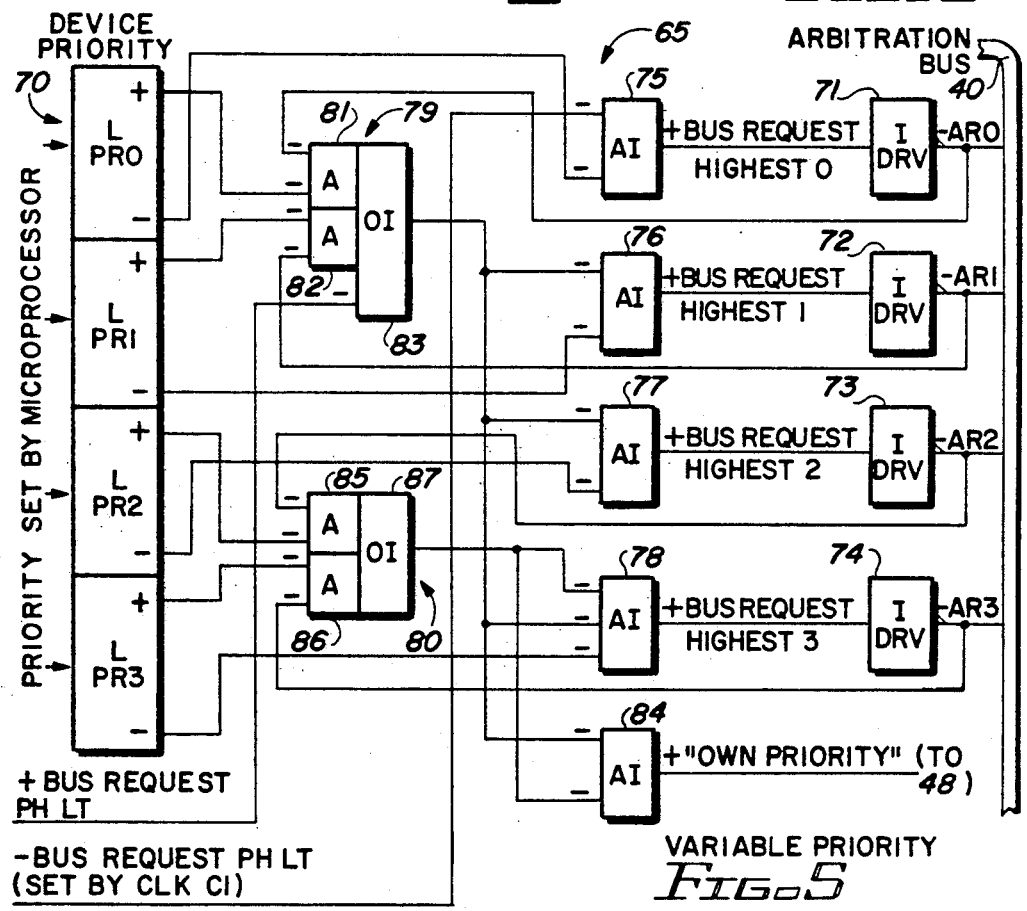

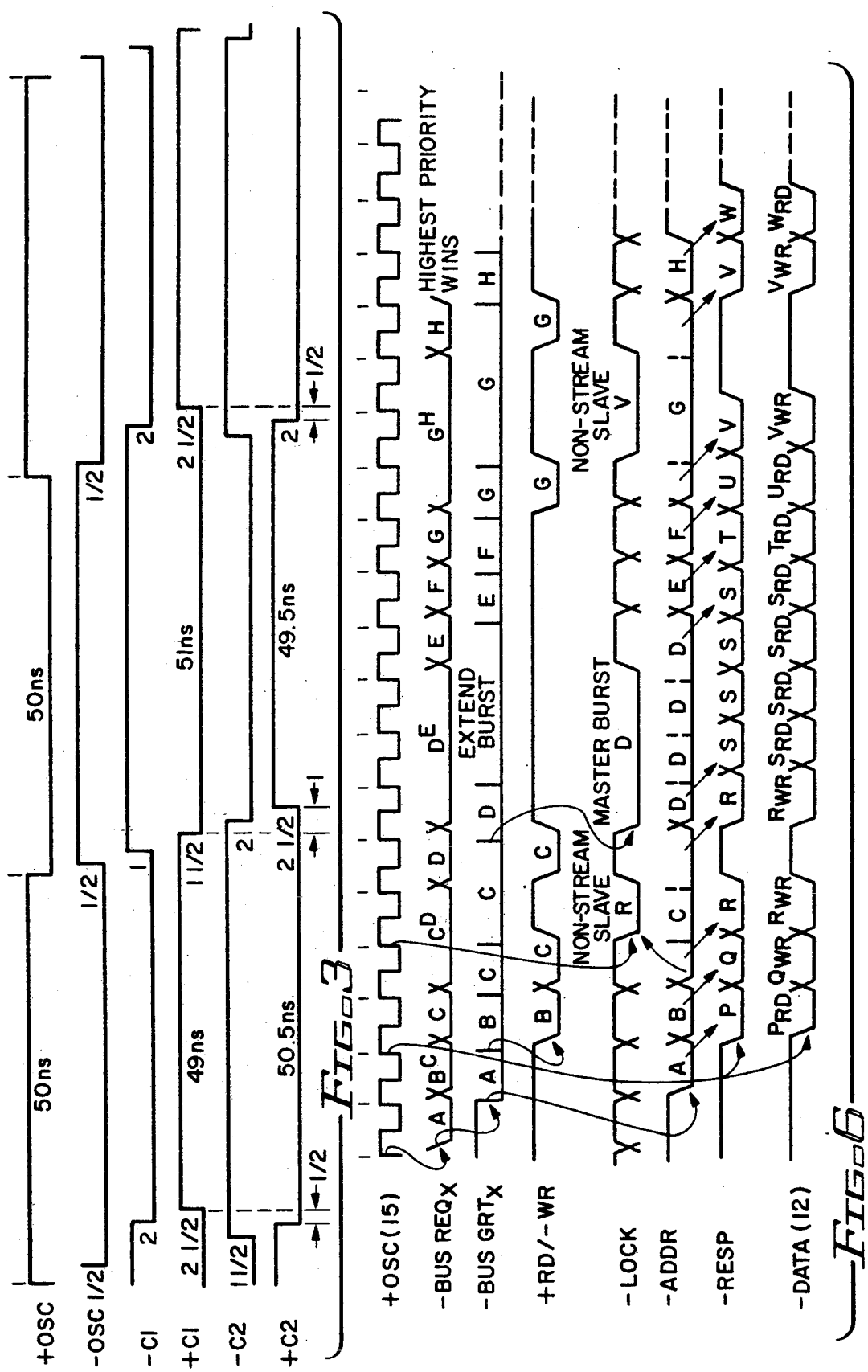

DYNAMIC BUS ARBITRATION WITH CONCURRENT SAME BUS GRANTING EVERY CYCLE

This is a continuation of copending application Ser. No. 07/586,349, filed on Sept. 21, 1990, now abandoned.

This invention relates to apparatus for managing data transfers across a nondedicated bus between a memory and/or a plurality of external devices (including processors) and more particularly to means incorporated therein to arbitrate priority between such devices more efficiently by eliminating wasted arbitration cycles and large burst buffers and making the full bandwidth available for data transfer.

BACKGROUND OF THE INVENTION

The IBM Microchannel Architecture Supplement for the PS/2 hardware interface technical reference, dated November 1989, describes a channel architecture in current widespread use. It discusses, at pages 30-33, burst transfer and local arbitration and preemption between bus masters. This and other currently used methods and means for channel bus arbitration for direct memory access (DMA) require a number of cycles to arbitrate priority between multiple external devices to determine the winner. This reduces the time available for data transfer.

In systems heretofore proposed, no granting of bus control is permitted during these arbitration cycles. These arbitration cycles constitute overhead which reduces bandwidth availability. To reduce this overhead, a current, but inefficient, solution is to group data transfers into bursts of back-to-back (i.e., successive, uninterrupted) cycles. But this undesirably requires additional hardware in the form of large memory buffers and their control circuitry, whose operation has to be interrupted at variable intervals so as not to overrun other DMA transferring devices of higher priority which must be allowed to preempt. To avoid hogging of the bus by an external device, elaborate fairness algorithms have been devised that add still further to logic complexity and only slightly relieve the symptom instead of eliminating the problem.

No prior art of which applicant is aware describes apparatus which optimizes bus arbitration between multiple external devices by using a minimum of arbitration logic that (1) eliminates large burst buffers and wasted arbitration cycles, (2) permits data transfer in a multiplexed continuous sequential stream from different external devices, and yet, (3) like the prior art, permits the priorities of the respective external devices to be changed dynamically.

SUMMARY OF THE INVENTION

A computer bus management apparatus is provided in which wait arbitration cycles and burst mode latency are eliminated. Bus interfacing protocol is simplified by obviating the need for the data streaming buffers and arbitration logic previously required. External devices know in advance when bus access will be granted, permitting faster pipelined operation. Also, since the highest requesting devices will always be granted bus mastership in sequence until all devices are serviced, problems of hogging and fairness are automatically resolved on a priority basis because long burst transfers are no longer required.

These advantages are achieved by providing at least two nonoverlapping clocks per transfer cycle and at least one transfer cycle per arbitration cycle. Arbitration priority requests from each external device are transmitted to the arbitration bus only at the rise of the first of the clocks. The priority code of the external device with the highest priority is determined at the end of the last of the clocks. Priority codes may be fixed or changed dynamically.

The invention may be implemented (a) with an address bus and bidirectional data bus; or (b) for faster pipelining, with a unidirectional outgoing bus for addresses and data multiplexed at half-cycle periods, with the data bus being merely incoming unidirectional; or (c) with a single nondedicated bidirectional bus with addresses being sent only once at the beginning of a long transfer, and during subsequent data transfer cycles incremented sequentially until a new nonsequential address is sent.

BRIEF DESCRIPTION OF THE DRAWINGS

FIG. 1 is a block diagram of a computer bus management apparatus which incorporates the invention;

FIG. 2 is a schematic diagram of circuitry associated with each external device for generating two nonoverlapping clock cycles from a single source for implementing the invention;

FIG. 3 is a timing diagram showing the nonoverlapping clock cycles generated by the circuitry of FIG. 2;

FIG. 5 is a schematic diagram that can be substituted in a portion of FIG. 4 to provide circuitry that grants a bus master at the end of the last of said clock cycles according to a priority that can be set dynamically; and FIG. 6 is a timing diagram illustrating the pipelining of bus requests, bus grants, addresses, data transfers and interlocks to provide successive burst or stream read/write operations.

DESCRIPTION OF PREFERRED EMBODIMENTS

Figure 4:
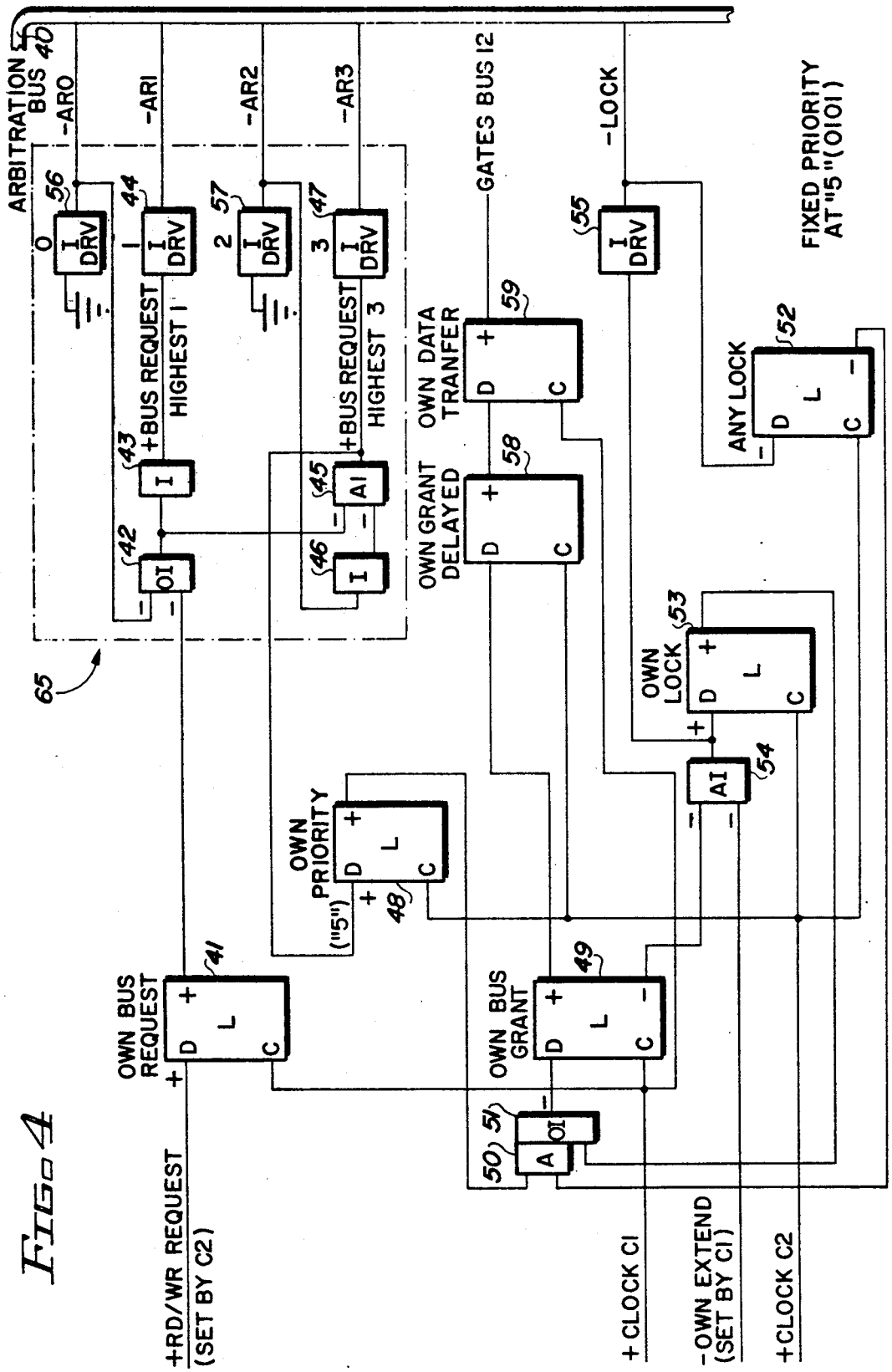
FIG. 4 is a schematic diagram of arbitration circuitry that grants a bus master at the end of the last of said clock cycles according to a fixed priority, illustratively assumed as "5" (0101)

As illustrated in FIG. 1, the bus management apparatus embodying the invention comprises a central processing unit (CPU) 10 that communicates over a nondedicated system bus 12 with a main memory 11 and with a plurality of external devices, such as 13, 14. The term "external devices", as herein used, is intended generically to cover other CPUs and peripheral devices such as disk files, printers, etc. A signal source, such as an oscillator 15, provides square wave signals to each external device. As illustrated, oscillator 15 is separate from the CPU; but, if preferred, its signal-providing function may be supplied by the CPU.

Note that, according to a feature of the invention, no bus controller or DMA controller is required.

As illustrated in FIG. 2, each external device 13, 14 includes a pair of inverters 20, 21 and a pair of buffer drivers 22, 23. When the oscillator 15 goes positive, it causes a rise of the signal in line 24. This signal is applied directly to AND gate 25, and also indirectly to said AND gate by being inverted and then reinverted by inverters 20, 21 to provide a time delay. At the end of the time delay, the signal gated out from AND gate 25 is inverted by OR gate 26 and causes buffer driver 22 to drive clock C1 positive. Meanwhile, the output of OR gate 26 will be ANDed at 27 with the somewhat delayed output from inverter 20 and cause OR gate 28 to invert the signal and cause buffer driver 23 to drive clock C2 positive. Gates 25, 26 are identical with gates 27, 28.

The timing of the positive and negative cycles of the respective clocks C1 and C2 is depicted in FIG. 3. Clocks C1 and C2 are 180° out of phase. However, according to a feature of the invention, because of the delay through inverter 21, the cycle length of clock C1 is slightly shorter than that of clock C2 to render the clock cycles nonoverlapping. For example, assuming the cycle length of oscillator 15 is 100 nanoseconds (ns), then the phase length of positive clock C1 is 49 ns based on a 2½ ns delay from the leading edge and a 1½ ns delay added to the trailing edge; and this results in a phase length of 51 ns for the negative clock C1. However, positive clock C2 has a slightly longer phase length of 49.5 ns, based on a 2½ ns delay from the leading edge and a delay of 2 ns added to the trailing edge, which results in a phase length of 50.5 ns for negative clock C2.

The broken lines 29, 30, 31 (FIG. 2) are connections that are preferably provided for diagnostic test purposes, are normally inactive, and are shown here only for purposes of completeness. A negative signal in line 29 will suppress clock C1, resulting in only clock C2 being active. Similarly, a negative signal in line 30 will suppress clock C2, resulting in only clock C1 being active. A positive signal in line 31 will condition the inverting OR gates 26, 28 to maintain both clocks C1 and C2 positive continuously.

According to another feature of the invention, every external device 13, 14 knows at the same preselected time early in the cycle—namely, at the rise of the first clock, C1—when it is to become the bus master. Arbitration requests can only be changed on an encoded arbitration bus 40 (FIG. 4) at the rise of clock C1 and thereafter will be stable for granting a bus master at the fall of the last clock, C2.

Referring now to FIG. 4, the lines AR0, AR1, AR2, AR3 and −Lock are OR dot connected to arbitration bus 40. Any external device 13, 14 wishing to get access to bus 12 records its Read or Write request into a latch (not shown) set by clock C2. This request is passed through an Own Bus Request polarity hold latch 41 clocked by clock C1. Latch 41 has a positive output that goes to circuit 42. If there is no higher priority on arbitration bus 40, the level of AR0 is positive, and the OR circuit 42 acts as an inverter that provides a negative output. This output is inverted at 43 and becomes a positive Bus Request Highest 1. This request is inverted by inverting driver 44, putting a negative AR1 level on arbitration bus 40. This request together with Bus Request Highest 3 will pass through, and the requesting device 13 or 14 will become the bus master.

If another device on the arbitration bus 40 has the highest level AR0 active, the signal in the AR0 line from the bus to OR-invert circuit 42 will be negative resulting in a positive output from circuit 42 that blocks any output from the bus requests on lines AR1 and AR3. The positive output from circuit 42 will also cause AND-invert circuit 45 to block any passthrough of requests to the AR3 branch of arbitration bus 40.

As illustrated in FIG. 4, the priority is fixed at 5. Hence, for code 5, the Own Priority in a four-bit code are the bits AR1 and AR3, with AR3 being the least significant bit.

If the AR2 higher priority bit from an external device is active, it will be inverted at 46 and change the polarity at the input to the AND-invert circuit 45 to positive. If either one of these inputs to AND-invert circuit 45 is positive, the output of said circuit will be negative; and in such case, through inverter driver 47, no negative output can appear at AR3.

If there are no AR0 or AR2 priority requests from any other external devices, both inputs to the AND-invert circuit 45 will be negative. The output of circuit 45 will then render the Bus Request Highest 3 output positive. This output is inverted by inverter driver 47 and appears as an AR3 negative active output. The output of AND-invert circuit 45 (which is Bus Request Highest 3 in this case) is also the decode of its own priority and preconditions an Own Priority polarity hold latch 48 during clock C2. Latch 48 will latch according to the condition at the end of clock C2.

According to a feature of the invention, once the Own Priority latch 48 is latched, it can set the Own Bus Grant polarity hold latch 49 on the following cycle for granting the next transfer cycle. The output of Own Priority latch 48 passes through AND gate 50 and is inverted by the OR-invert gate 51 and will be latched by Own Bus Grant latch 49 at the beginning of clock C1. This signals the particular device that it is the bus master for that transfer cycle.

The previous device that had been bus master before this priority determination may extend its cycle even though the Own Priority latch (like 48) of another external device has been latched. This delays the next cycle until the previous master releases the bus 12. The delay function is controlled by the second input to AND gate 50 which is the output from Any Lock polarity hold latch 52. Latch 52 will have been latched up by the previous clock C2 from the −Lock signal on bus 40. The delay may be for any number of cycles of clock C2.

As soon as the extended cycles are complete, the −Lock signal will be freed by the previous bus master at the clock C1 time. This will allow the Own Bus Grant latch 49 to proceed in a pipelined fashion at the next clock C1 controlled by the Any Lock latch 52 releasing at clock C2, provided no higher priority requests are received in the meantime to preempt the current arbitration priority.

Assume now a device wishes to take two or more clock cycles in succession because of a slow slave receiver or because it wants to do a burst mode. The device will latch up its Own Lock polarity hold latch 53 at clock C2 through the AND-invert circuit 54. The Own Extend request must be set by clock C1 into another latch (not shown) before it also appears at the AND-invert circuit 54. The same output of AND-invert circuit 54 through inverter-driver 55 sets the Own Lock latch 52 and also drives the common −Lock signal on the arbitration bus 40. As long as the Own Lock latch 53 remains set, its positive output will be ORed at OR-invert circuit 51 to hold the Own Bus Grant latch 49 on for multiple cycles. Again, once the extended cycle is completed, the Own Lock latch 53 will be reset by clock C2 and the Own Bus Grant latch 49 will be reset by clock C1. This allows the −Lock signal to disappear. All the external devices will now be free to continue successive data transfers.

Inverter-drivers 56, 57 are inactive internally and their inputs are tied to ground because they are not involved in generation of the priority code 0101; however, they remain active with external inputs from bus 40.

The pipelined timing for gating data on bus 12 is obtained by setting the positive output from Own Bus Grant latch 49 into an Own Grant Delayed latch 58 at clock C2, and setting the output of latch 58 into an Own Data Transfer latch 59 at clock C1. The output from latch 59 is the timing signal that gates data to or from bus 12.

FIG. 5 depicts circuitry that can be substituted for circuitry 65 (enclosed in broken lines in FIG. 4) to permit the priority code to be varied dynamically. A four-bit priority code that provides up to 16 different priorities is set into a register 70 at the beginning of an operation, such as at the time of Initial Program Load (IPL). This circuitry 65 includes four inverter drivers 71, 72, 73, 74. These drivers are open collector or dotting drivers. They set up the arbitration bits AR0, AR1, AR2 and AR3, driven by AND gates 75, 76, 77, 78, respectively. These AND gates determine the highest priority by means of two complex logic gates 79, 80, which are actually single circuits.

Gate 79 comprises two AND gates 81, 82 and a three-way OR-invert gate 83. OR-invert gate 83 inhibits all the lower request lines AR1, AR2 and AR3. Gate 83 also inhibits Own Priority circuit 84 if a higher priority is externally active on the arbitration bus 40. If AR0 is active and the polarity hold latch PR0 output of register 70 is not, AND gate 81 through OR-invert circuit 83 will inhibit the AR1, AR2 and AR3 and the Own Priority signals.

Similarly, with AND gate 82, if AR1 is active and the polarity hold latch PR1 is not, then AR1, AR2, AR3 and Own Priority signals will be inhibited; whereupon the arbitration will preclude the device from being the next to be serviced.

The last input to the invert gate 83 is the output of a Bus Request polarity hold latch (not shown) which is set by clock C1 and requests an arbitration cycle for data transfer. Each arbitration cycle has a preselected length equal to one (as illustrated) or more fixed clock cycles. The number of clock cycles per transfer cycle is dependent upon the operational speed of the device being addressed by the then active bus master. The +Bus Request polarity hold latch line will be negative if it is not active. This automatically will inhibit all the blocks 76, 77, 78 and 84. When the output of AND-invert circuit 84 is positive, it indicates that this is currently the highest priority device that has won the arbitration and can start transferring on the next sequence of clock cycles.

Complex logic gate 80 comprises AND gates 85 and 86, which operate similarly to gates 81 and 82 except that they deal with the two lower arbitration bus bits AR2 and AR3. Also, the OR-invert circuit 87 has the same function as circuit 83 for the lower two bits; but it does not require connection of the +Bus Request polarity hold latch (not shown) because that output is already controlled by circuit 83, the output of which already goes to all the gates 76, 77, 78, 84. The output of the OR-invert circuit 87 therefore only controls the lowest significant bit on the AR3 line of arbitration bus 40 and also its Own Priority gate 84 for latching.

The most significant bit on the AR0 line of arbitration bus 40 is the highest bit. Any device driving that bit will automatically have the highest priority. If the microprocessor-set priority in register 70 indicates that a particular device has a priority PR0 or higher bit active, then any −Bus Request polarity hold latch (not shown) which is also set by clock C1 will automatically drive the AR0 line of arbitration bus 40. In this case, this bit will always be active and does not need to be inhibited.

FIG. 6 is a timing diagram depicting the pipelining of various operations based on the use of a free-running oscillator 15 (FIG. 1) that can be of any value depending upon the technology. Current technology uses a 100 ns cycle and future technologies already are planned for 50 ns. The Bus Request can always be changed at the beginning of clock C1; i.e., the first half of the oscillator cycle. The Bus Request stays on until the following clock C1. The Bus Grant is also set by clock C1; but it follows the Bus Request cycle and therefore is pipelined always one cycle behind.

FIG. 6 shows a plurality of devices with different priorities—from A, the highest to H, the lowest. FIG. 6 also indicates how these priorities form successive transfer cycles, either as bursts or delayed by slow non-streaming slaves so the slaves can receive data within their respective timings. "Slave", as herein used, refers generically to any device with which the bus master device wishes to communicate.

Every time a device wins the bus 12, it will latch internally its Own Bus Grant latch (like 49, FIG. 4). This latch controls the current cycle for a device that wins the arbitration. At that time, that device is in charge of the cycle for communicating with the slave. It sends the address on the bus 12 during the Own Bus Grant cycle. It also indicates whether it wants to do a read or write function on the +Read/−Write signal. The −Lock signal will also become active if the bus master wishes to operate in a burst mode; i.e., lock out other devices for a short burst of cycles before the next highest priority device can come in. If one data transfer has occurred and the slave then sees its own address repeated, it may wish to extend the time it needs to either receive or send data. It can do that in one or more increments of the basic bus cycle by setting the −Lock signal with logic similar to that shown in FIG. 4 used by bus masters. The response line from each device indicates that it has either sent or received the data on bus 12. The −Lock signal can also be a response on the following cycle from the slave indicating that it cannot take any successive cycle.

As shown in FIG. 6, a bus request is followed by a bus grant and addressing performed by the bus master; and the read or write function occurs as the third sequence of the pipelined operation.

FIG. 6 depicts writing and reading by various masters A-H to or from slaves P-W, in different types of operational mode.

As illustrated, the invention has been implemented with an address bus and a bidirectional data bus. However, for faster pipelining, the invention may be implemented with a unidirectional outgoing bus for addresses and data multiplexed at half-cycle periods, and the data bus can be merely an incoming unidirectional data bus.

Or, if preferred, the invention can be implemented with a single nondedicated bidirectional bus. In such case, addresses will be sent only once at the beginning of a long transfer and during subsequent data transfer cycles, the addresses will be incremented sequentially unless a new nonsequential address is sent. More specifically, at the beginning of the long transfer, the device will take a burst of two cycles, sending the address during the first, and data during the second and subsequent cycles. FIG. 6 in this case would be modified to eliminate the address bus, and the arbitration bus will then become an indirect address pointer for the multiplexed external devices.

While the invention has been shown and described with respect to preferred embodiments thereof, it will be understood by those skilled in the art that changes in form and detail may be made in these embodiments without departing from the scope and teaching of the invention. Accordingly, the apparatus and method herein disclosed are to be considered merely as illustrative, and the invention is to be limited only as specified in the claims.

We claim:

1. Apparatus for optimizing, without requiring data latency buffers, but arbitration during direct memory access (DMA) data transfers across a nondedicated bus (12) interconnecting a memory (11) and a plurality of external devices (13, 14) each having an arbitration priority, comprising:

a single arbitration bus (40) connected to each of the external devices;

clock generating means connected to the nondedicated bus for providing successive sequences of two nonoverlapping clock signals (C1, C2) per clock cycle, and data transfer cycles equal to the number of clock cycles required for a responding one of the devices to acknowledge completion of a data transfer, and an arbitration cycle equal to preselected number of clock cycles;

means, operatively connected to the clock generating means and arbitration bus, responsive to only the beginning edge of the first of said clock signals in one sequence for transmitting arbitration priority bus requests from each external device to the arbitration bus;

means, operatively connected to the clock generating means and each device, responsive to the ending edge of the last of said clock signals of an arbitration cycle in that same said one sequence for dynamically conditioning the external device having the highest bus priority to designate itself as the next external device which is to become bus master; and transferring means including first latch means (49, 59), operatively connected to the clock generating means and nondedicated bus, responsive to the beginning of the first clock signal of a cycle during said one sequence for transferring addresses and responsive to the beginning of the first clock signal during the next cycle following said one sequence for transferring data for a single data transfer or variable burst length data transfer between the designated bus master and the memory or another of the external devices via the nondedicated bus starting on the next clock cycle, after which a then active bus master relinquishes control.

2. The apparatus of claim 1, including a register (70) operatively connected to the arbitration bus for storing a priority code designating the priority of at least one of the external devices, and a microprocessor connected via the nondedicated bus to the register for dynamically modifying said priority code for changing said priorities.

3. The apparatus of claim 1, including circuitry connected to the arbitration bus for preselecting and fixing a priority code establishing the priority of each of the respective external devices.

4. The apparatus of claim 1, including one means (41) connected to drive the arbitration bus and set by said beginning edge of first clock signal in said one sequence and another latch means (48) connected to the arbitration bus to receive the arbitration priority and set by said ending edge of said last clock signal in said one sequence for synchronizing all bus requests for bus master priority.

5. The apparatus of claim 1, including means, operatively connected to the arbitration bus and clock generating means, responsive to a bus request from one of the devices initiated by the beginning of said first clock cycle for defining a first tier of pipelining of said arbitration cycles on said single arbitration bus and responsive to a priority bus grant to one of the devices at the end of said last clock cycle for defining a second tier of pipelining of said arbitration cycles in a two-tiered overlapping fashion with no loss of address or data transfer cycles due to arbitration, and means connected to the nondedicated bus for pipelining addresses and data transfers on said nondedicated bus up to a third tier of pipelining.

6. The apparatus of claim 1, wherein said transferring means is responsive to a burst transfer command from one of the external devices at a time to generate a signal for transferring data back-to-back without reduction in data transfer bandwidth in a multiplexed continuous sequential stream from different external deices one at a time over the nondedicated bus.

7. The apparatus of claim 1, including means that includes two latches, separate from said first latch means, operatively connected to said clock generating means and arbitration bus and responsive to the setting of one of these latches (Own Extend) by said first clock signal in said one sequence and to the setting of the other of these latches (53) by said last clock signal in the sequence immediately preceding said one sequence for permitting the then active bus master to retain communication with one of the external devices for an additional transfer cycle or cycles.

8. The apparatus of claim 1, including means connected to the devices and clock generating means for preempting a device that had been designated as next in line to be the bus master when (a) the then active bus master has retained bus mastership for more than one transfer cycle by initiating a locking period (by —Lock signal), and (b) a higher priority device gains arbitration priority during said locking period.

9. The apparatus of claim 1, wherein the nondedicated bus comprises a unidirectional bus for outgoing addresses and data multiplexed at half-cycle periods, and a data bus that is unidirectional incoming.

10. The apparatus of claim 1, wherein the nondedicated bus is a single bidirectional bus for addresses and data, and including means operatively connected to said clock generating means and nondedicated bus for sending addresses only at the beginning of a long transfer, and during subsequent data transfer cycles, incrementing the addresses sequentially as long as the addresses constitute a continuous sequence.

11. A method for optimizing a bus arbitration pass during direct memory access (DMA) data transfers across a nondedicated bus between a memory and/or a plurality of external devices each having an arbitration priority, comprising the steps of:

providing successive sequences of two nonoverlapping clock signals (C1, C2) per clock cycle; and data transfer cycles equal to the number of clock cycles required for a responding one of the deices to acknowledge completion of a data transfer, and an arbitration cycle equal to a preselected number of clock cycles;

transmitting arbitration priority bus requests for the external devices to a single arbitration bus only at the beginning edge of the first of said clock signals in one of said sequences;

at the end of the last of said clock signals in said one sequence, dynamically conditioning the external device then having the highest bus priority code to automatically designate itself as the next external device to become bus master, thereby constituting a priority bus grant to said next external device;

continually repeating the arbitration pass to allow any higher priority device to preempt a then currently designated priority device until a then active bus master relinquishes control of the nondedicated bus; and transferring addresses and data between the designated bus master and the memory of another of the external devices via the nondedicated bus during the next cycle after said then active bus master relinquishes control.

12. The method of claim 11, including the step of using a microprocessor, dynamically changing the priorities of at least one of the external devices during initialization of a program.

13. The method of claim 11, including, during the step of transferring addresses and data, transferring data on the nondedicated bus from different external devices in a multiplexed continuous sequential stream and without sequence delays.

14. The method of claim 11, including the step of concurrently pipelining bus requests and bus grants of said arbitration cycles on said single arbitration bus independent of data transfers, thereby eliminating arbitration overhead.

15. The method of claim 11, including the step of permitting that one of the external devices with which the then bus master desires to communicate to elongate transfer cycles in increments of the cycle length of the two nonoverlapping clock signals to increase the time for slower external devices to complete a single data transfer.

16. The method of claim 11, including the step of automatically preempting the device designated as next in line as bus master, when
(a) the then active bus master retains bus mastership for more than one transfer cycle by initiating a locking period, and
(b) a higher priority device gains arbitration during said locking period.

17. The method of claim 11, wherein during the step of transferring addresses and data, data is transferred without requiring prior knowledge of the number of data transfer cycles required to complete a data transfer sequence.

* * * * *